United States Patent [19]

McStravick

[11] E Patent Number: Re. 31,978

[45] Reissued Date of Patent: Sep. 3, 1985

[54] WELL TOOL HAVING KNITTED WIRE MESH SEAL MEANS AND METHOD OF USE THEREOF

[75] Inventor: David M. McStravick, Houston, Tex.

[73] Assignee: Baker Oil Tools, Inc., Orange, Calif.

[21] Appl. No.: 603,629

[22] Filed: Apr. 25, 1984

Related U.S. Patent Documents

Reissue of:

[64] Patent No.: 4,326,588
Issued: Apr. 27, 1982
Appl. No.: 122,225
Filed: Feb. 19, 1980

[51] Int. Cl.[3] ..... E21B 33/128; E21B 33/129

[52] U.S. Cl. ..... 166/387; 166/124; 166/134; 277/121; 277/125; 277/188 A; 277/DIG. 6

[58] Field of Search ..... 166/195, 196, 118, 123, 166/127, 134, 135, 179, 387, 124; 66/170, 196; 277/117, 118, 121, 122, 125, 188 A, DIG. 6

[56] References Cited

U.S. PATENT DOCUMENTS

| | | | |
|---|---|---|---|
| 1,514,284 | 11/1924 | Heeter | 166/196 X |
| 2,578,523 | 12/1951 | Llewellyn et al. | 277/DIG. 6 |
| 2,761,203 | 9/1956 | DeWitt, Sr. | 66/196 |
| 2,942,665 | 6/1960 | Davis et al. | 166/140 X |
| 3,033,722 | 5/1962 | Goodloe | 112/417 |
| 3,330,357 | 7/1967 | Elliston | 166/123 X |
| 3,356,142 | 12/1967 | Crow et al. | 166/134 |
| 3,381,969 | 5/1968 | Crow et al. | 277/117 |
| 3,386,515 | 6/1968 | Crow et al. | 166/196 X |
| 3,416,609 | 12/1968 | Kilgore | 166/134 X |
| 3,920,252 | 11/1975 | Dechavanne | 277/118 A |
| 4,219,204 | 8/1980 | Pippert | 277/188 A |

*Primary Examiner*—Stephen J. Novosad
*Attorney, Agent, or Firm*—Norvell & Associates

[57] ABSTRACT

A well tool, such as a packer apparatus, is adaptable for insertion on a conduit within a subterranean well having casing therein. The well tool comprises a cylindrical mandrel which is communicable to the conduit. Slip means are carried exteriorly around the mandrel and are movable into expanded position for anchoring the apparatus to the casing whereby subsequent longitudinal movement of the apparatus in at least one direction is prevented. Seal means are circumferentially extending exteriorly around the mandrel and are urgable into sealing relation with the casing to prevent fluid communication thereacross, the seal means comprising at least one section of transversely compressible seamless, knitted elements generally defined by a continuous series of interlocking ductile metal-containing loop members.

34 Claims, 5 Drawing Figures

WELL TOOL HAVING KNITTED WIRE MESH SEAL MEANS AND METHOD OF USE THEREOF

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a tool insertable within a subterranean well comprising a seal means defined by a continuous series of transversely compressible interlocking ductile metal-containing loop members.

2. Description of the Prior Art

During certain operations in a subterranean oil or gas well, such as during a completion or workover procedure, it is common practice to utilize a packer assembly, bridge plug or other isolation tool to separate one section or zone of a well from another section or zone. Such apparatuses typically employ elastomeric sealing members, utilized alone or in combination with other sealing elements, such as virgin tetrafluoroethylene and/or glass-filled tetrafluoroethylene components (sometimes referred to under the tradename "Teflon"), as the primary means for isolating the section or zone, the seal means, upon manipulation of the tool, sealing against the internal wall of the casing. In extremely hostile well environments, such as those wherein the bottom hole temperature is in excess of about 350° F. and/or exposed to considerably high concentrations of $H_2S$ and or $CO_2$, an acrylonitrile-type elastomeric substance has been utilized in the seal means of the tool, to provide somewhat effective working life for the tool. The use of such acrylonitrile-type elastomers is not entirely satisfactory because this material can, with time, chemically degrade to the extent that its elastomeric properties are lost in the hostile environment, described above, Other materials, such as tetrafluoroethylene have the desired chemical inertness, but tend to extrude under high temperature and pressure. Additionally, when metallic back-up rings are utilized in such seal systems, wherein a gap is defined in the metallic ring upon expansion thereof into engagement with the casing, "gaps" or "voids" will be necessarily defined at one or more points thereon which require sealing with respect to the casing in order to insure the integrity of the entire seal system.

The present invention is directed to a seal means for use in a well tool, such as a well packer, which prevents extrusion of such inert sealing elements, described above, and which will fill "gaps" and "voids" within metallic back-up rings within the seal system.

SUMMARY OF THE INVENTION

The present invention is directed to a well tool, such as a well packer, bridge plug, or other sealing means which is adaptable for insertion in a conduit within a subterranean well and for selective sealing engagement with a second conduit, such as a casing. The well tool comprises a cylindrical mandrel communicable to the first conduit, such as the tubular work or production string. Slip means are carried exteriorly around the mandrel and are moveable into expanded position for anchoring the apparatus to the second conduit, or casing, whereby subsequent longitudinal movement of the apparatus in at least one direction is prevented. Seal means circumferentially extend exteriorly of the mandrel and are urged into sealing relation with the second conduit to prevent fluid transmission thereacross, the seal means comprising at least one section of transversely compressible seamless, knitted elements generally defined by a continuous series of interlocking ductile metal-containing loop members. In a preferred form, the seal means may further comprise as asbestos-laden material innerwoven among the loop members. In still another preferred form, the seal means may additionally comprise upper and lower sections of the seamless elements, together with a seal member comprising one of tetrafluoroethylene and flourinated ethylene propylene. Metal extrusion barriers or secondary supports, together with glass-filled seal members, also may be incorporated within the seal means.

DESCRIPTION OF THE PREFERRED EMBODIMENTS

Figure 1:
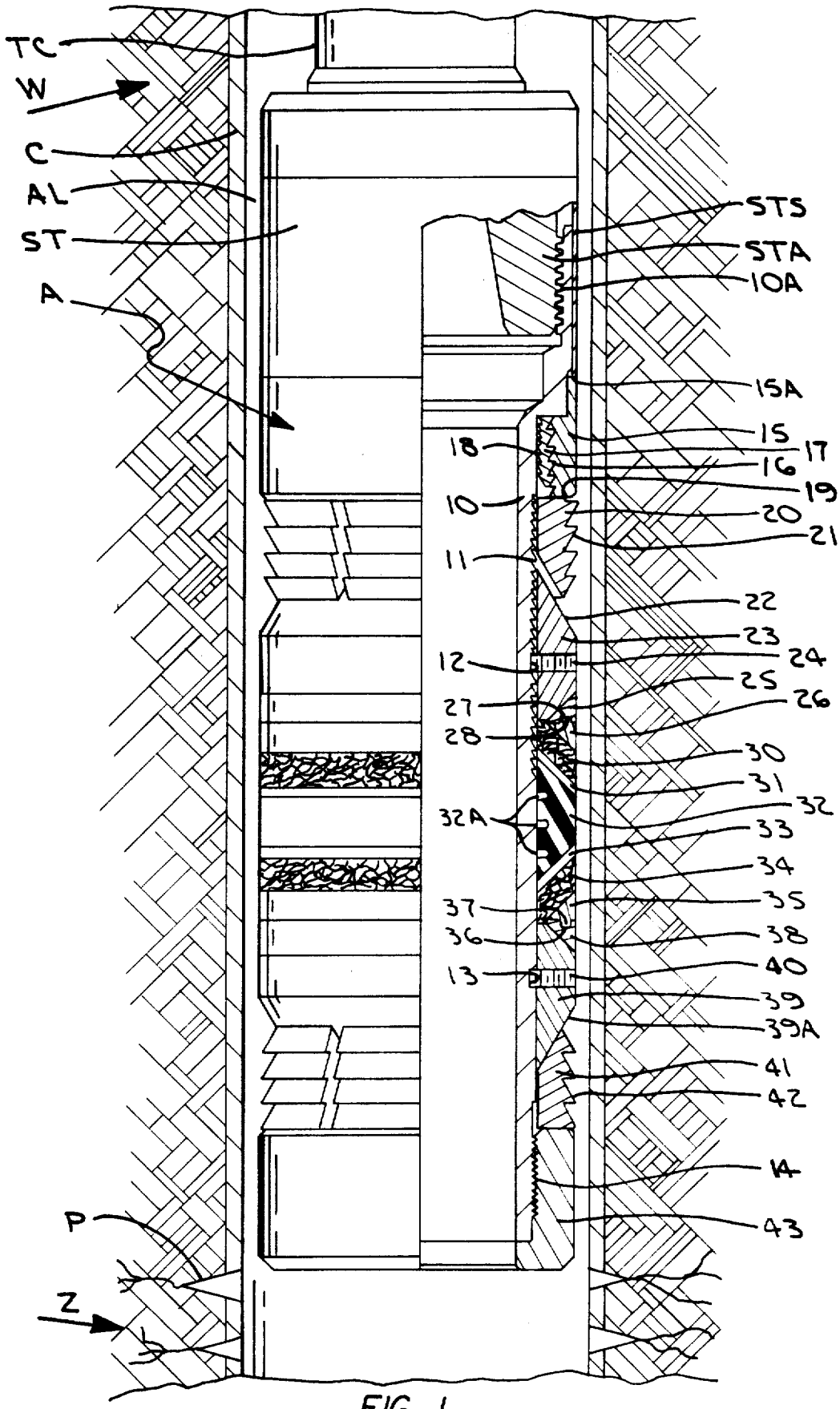
FIG. 1 is a longitudinally extending sectional view, the left hand side showing the exterior, and the right hand side being a cut-away view showing the interior, of a well packer apparatus employing the present invention, prior to setting in a well having casing therein.

Now referring to FIG. 1, the apparatus A which is illustrated as a well packer, is carried on a tubular conduit TC and is inserted within a well W extending to a production zone Z, the well W having a string of casing C extending from the zone Z to the top of the well, the casing C having perforations P therethrough communicating from the zone Z to within the annulus AL.

The apparatus A is run on the tubular conduit TC within the well W below and in operational communication with a setting tool ST having an internal setting tool activator STA affixed by threads 10A to a longitudinally extending cylindrical mandrel in the apparatus A, the setting tool ST also having a setting tool sleeve STS formed on the exterior of the setting tool ST. Together, the setting tool sleeve STS and the setting tool activator STA provide a "push-pull" action upon the apparatus A during the setting thereof.

The setting tool may be one of a number of conventionally and commercially known setting tools, and the particular setting tool or mechanism utilized does not form a part of the present invention. Typical of such setting tools is that as shown in the Technical Data Manual Unit No. 2717 of the Baker Packers Division, Baker International Corporation and the Baker Packers Model "J" Hydraulic Setting Assembly, Product No. 413-71. However, any setting tool which is adaptable to provide a "push-pull" action, as described above, may be used in conjunction with the apparatus A for the setting thereof.

The mandrel 10 has defined thereon a series of exteriorly defined circumferentially extending wicker elements 11 which, together with engageable wickers 18 on a body lock ring 17 carried exteriorly around the mandrel 10 are utilized in the setting of the apparatus A. A hole 12 is defined in the mandrel 10 for receipt of one end of a shear screw 24 protruding therein and out of an upper cone element 23 for initial securement of the upper cone element 23 around the mandrel 10. A similar hole 13 holds the exterior inwardly protruding end of a lower shear screw 40 insertable therein and extending interiorly from a lower cone element 39. The mandrel 10 is terminated at its lower end by a series of threads 14 for affixation of a ported bottom sub element 43.

The wickered lock ring 17 is secured at threads 16 to a lock ring protector 15 having an upper end 15A receiving the lower end of the setting tool sleeve STS, prior to the setting of the apparatus A. The lower end 19 of the lock ring protector abuts upon the upper face of a circumferentially extending series of slotted upper slips 20 having exteriorly protruding teeth 21 thereon which, upon setting of the apparatus A, will break up along longitudinal grooves and then contact and grasp the inner wall of the casing C for anchoring of the apparatus A relative to the casing C. An upper cone element 23 is carried below the upper slips 20 and circumferentially around the exterior of the mandrel 10, the upper cone 23 having a slanted guide surface 22 for guiding and urging the upper slips 20 outwardly into anchored position. The upper shear screws 24 is carried within a bore of the upper cone 23 and has its innermost end protruding outwardly of the cone 23 and into the hole 12 fo initial securement of the upper cone 23 to the mandrel 10.

Figure 3:
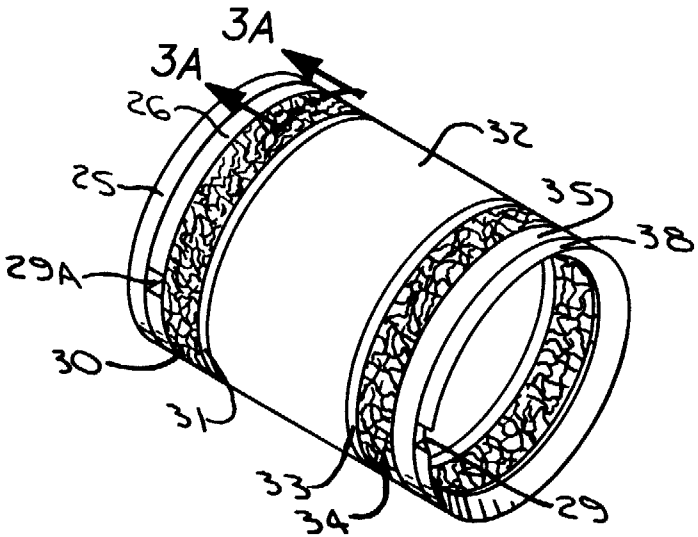
FIG. 3 is an enlarged perspective view of the seal assembly illustrated in FIGS. 1 and 2.
Figure 4:
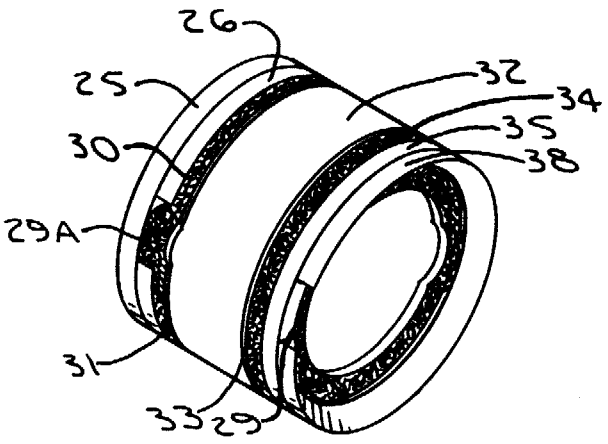
FIG. 4 is a perspective view of the seal means subsequent to the setting of the apparatus in the well.

An upper triangularly shaped cone ring element 25 is carried circumferentially around the mandrel 10 and below the upper cone 23 and is initially shouldered against said upper cone 23. This upper cone ring 25 typically is of a metallic substance and, when urged outwardly into engagement with the casing C, provides a metal back-up bridging means to prevent extrusion of other components of the seal means and further provide support to the sealing means. The cone ring 25 contains a groove 27 profiled on its lower face for receipt of a companion tongue 28 of a similarly constructed element ring 26, of triangular configuration. It should be noted that each of the rings 25 and 26 contain a gap, such as 29 shown in FIG. 3 which is enlarged (as shown in FIG. 4) upon activation of the apparatus A into sealing engagement with the casing C, the "gap" in the cone ring 25 being spaced 180° from the "gap" in the element ring 26. Such a gap is a construction detail of the rings 25–26 enabling each of the said rings to radially expand into engagement with the internal wall of the casing C.

Below the element ring 26 and extending circumferentially around the mandrel 10 is a section of transversely compressible seamless, knitted elements generally defined by a continuous series of interlocking ductile, metal-containing loop members. Such an element is described in U.S. Pat. No. 2,761,203, entitled "Resilient Gasket Forming Material And Method Of Reducing Same", and No. 3,033,722, entitled "Compressible Metal Gasket And Method Of Making Same", each being assigned to Metex Corporation of Edison, N.J., from which such a product can be readily obtained.

Figure 3A:
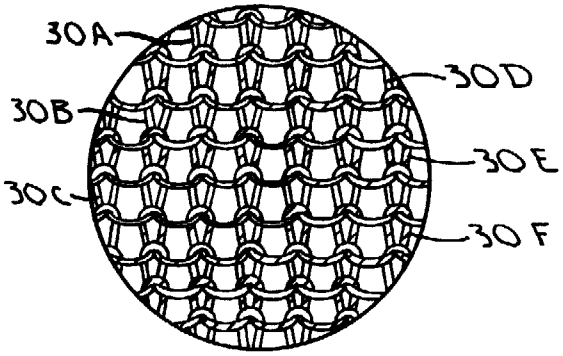
FIG. 3A is a cross-sectional view taken along line 3A—3A of FIG. 3 illustrating, in pre-crushed state the continuous series of interlocking ductile metal-containing loop members utilized in the seal means of the present invention.

Now referring specifically to FIG. 3A, this element consists of continuous series 30A, 30B, 30C, etc., of interlocking loops knitted in a tubular form, allowing two-way movement in the wire plane, affording unusual flexibility and resiliency, even under heavy compression loads and exposure to extreme temperatures. It has been found that knitted wire yields to applied force, yet maintains its compressive stress. Since there are no ribs, seams or other weak areas in this construction, the seal has a uniform strength over its entire area. When used in combination with other basic sealing material, such as asbestos-laden cords 30D, 30E, 30F, etc., interwoven between one or more of the loops 30A, 30B, 30C, etc., the knitted wire serves as a "backbone" sleeve or expander, imparting its resiliency to the combined element. This seamless, knitted element is compressed to contour to the general requirements of contour of the apparatus and may be fabricated from almost any material or combination of materials that may be drawn or filament form, such as stainless steel wire, or other ductile metals, such as aluminum, copper and special alloys, in combination wth the asbestos-laden material, other synthetic fibers, polymers and yarns. Such a knitted element is further disclosed in Bulletin No. M1-50 of the Metex Thermal-Mechanical Group, Metex Corporation.

Referring to FIG. 3, below the upper knitted wire mesh element 30 and communicating therewith is a secondary seal element 31, which may be typically a teflon or glass-filled teflon ring element. The main sealing component of the seal means in the apparatus A is defined as a virgin teflon ring element 32, preferably having grooved internally spaced circumferentially extending rib elements 32A thereon to permit flexing of the seal 32 during setting.

Below the main seal element 32 is provided a lower, preferably glass-filled teflon secondary seal element 33 which, in turn, contacts a second or lower knitted wire mesh element 34 of the same or similar construction as the upper knitted wire mesh element 30. Similarly, the seal means is terminated at its lowermost end by the companion lower cone 39 and lower element rings 35 and 38, respectively, of similar construction and design as the rings 25 and 26. A groove and tongue configuration 36 and 37, respectively, is defined between the rings 38 and 35 for interengagement thereof.

Carried circumferentially around the exterior of the mandrel 10 and below the lower element ring 38 is a lower cone element 39 receiving a lower shear screw element 40 therethrough having its innermost interior end received within the hole 13 in the mandrel 10 for securing the lower cone 39 to the mandrel 10 prior to the setting of the apparatus A. The lower cone 39 has a guide 39A for directing a series of slotted lower slip elements 41 having teeth 42 into radially extended positioning for securing the teeth 42 into the inner wall of the casing C to assist in anchoring the apparatus A unto the inner wall of the casing C.

OPERATION

The apparatus A is run into the well on a tubular conduit TC, such as the tubing string or the like, and is located above perforations P within the zone Z. The setting tool ST typically will be activated by pumping or gravitating a ball element through the tubular conduit TC until it lands upon a seat (not shown) in the setting tool ST. Thereafter, pressure is applied within the tubular conduit TC and against the ball and seat for transmission of hydraulic force through setting tool ST. The setting tool sleeve STS typically will be urged downwardly while the setting tool activator STA is stabilized or urged upwardly. This "push-pull" force is transmitted between the mandrel 10 and the components of the apparatus A extending therearound, and, because of the innerengagement of the bottom sub 43 to the mandrel 10 at threads 14, such action will cause the lock ring 17 to shift relative to the mandrel 10 upon innerengagement of the wickers 11–18, thereby urging the lock ring protector 15 against the upper slips 20 which are moved along the guide 22 of the upper cone 23 until the teeth 21 contact and engage the inner wall of the casing C. Concurrently, the force is transmitted from the upper slips 20 through the cone 23 and, subsequent to shearing of the shear screw 24, through the upper cone ring 25 and element ring 26, whereby the rings 25–26 expand radially outwardly, extending the length of the gap 29, until the rings 25 and 26 contact the inner wall of the casing C. The setting force continues to be transmitted to the upper knitted wire mesh element 30 which is urged outwardly into contact with the casing C to prevent extrusion of the ring 31 therebelow and to fill the gap defined in the element ring 26. The setting force continues to be transmitted through the apparatus A for outward urging of the virgin teflon ring 32, the lower glass-filled ring 33, the lower knitted wire mesh element 34, the lower cone ring 35 and the lower element ring 38.

It should be noted that as the lower knitted wire mesh element 34 extends outwardly, it will fill the extended "gap" or "void" in the lower cone ring 35 as it extends radially outwardly into sealing engagement with the casing C. The force continues to be transmitted to the lower cone members 39 which, by means of the guide 39A, urge the lower slip members 41 outwardly away from the apparatus A, such that the teeth 42 grasp the casing C, subsequent to shearing of the lower shear screw 40 from position on the mandrel 10.

Figure 2:
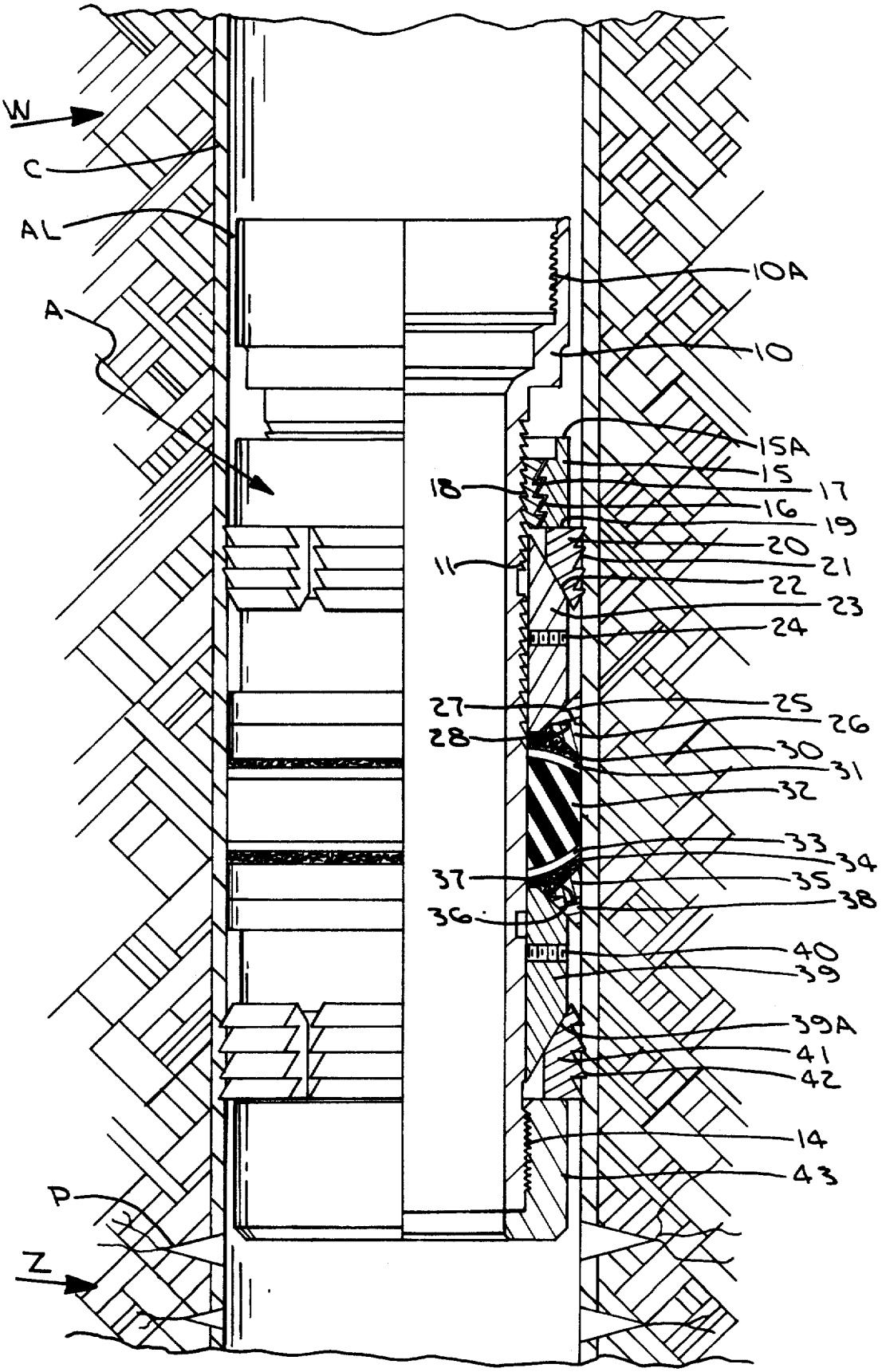
FIG. 2 is a view similar to that illustrated in FIG. 1 showing the component parts of the apparatus subsequent to setting of the apparatus, the seal means being illustrated in sealing relation to the casing, the slips being in anchored position.

The complete setting position of the apparatus A is shown in FIG. 2 with the upper and lower slip elements 20 and 41 respectively engaging in the wall of the casing C and the seal means being in sealed relationship with the casing C. The relative position of the components of the seal means in their expanded mode are as shown in FIG. 4.

Although the invention has been described in terms of specified embodiments which has been set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A packer apparatus adaptable for insertion on a conduit within a subterranean well having casing therein, said apparatus comprising: a cylindrical mandrel communicable to said conduit; slip means carried exteriorly around said mandrel and movable into expanded position for anchoring said apparatus to said casing whereby subsequent longitudinal movement of said apparatus in at least one direction is prevented; and seal means circumferentially extending exteriorly of said mandrel and urgeable into sealing relation with said casing to prevent fluid transmission thereacross, said seal means comprising at least one section of transversely compressible, seamless, knitted elements generally defined by a continuous series of interlocking ductile, metal-containing loop members, and further comprising [an elastomeric] *a sealing* material introduced among said loop members.

2. The apparatus of claim 1 wherein said seal means further comprises an asbestos-laden material interwoven among said loop members.

3. The apparatus of claim 1 wherein said seal means further comprises a bridging material introduced among said loop members.

4. The apparatus of claim 1, 2 or 3 wherein said seal means further comprises upper and lower sections of said seamless elements, and a seal member comprising one of tetrafluoroethylene and flourinated ethylene propylene spaced therebetween.

5. The apparatus of claim 4 further comprising at least one circumferentially extending interiorly facing groove on said first seal member to permit flexing of said first [seal] member during setting of said apparatus.

6. The apparatus of claim 1, 2 or 3 wherein said seal means further comprises upper and lower sections of said seamless elements, and a seal member comprising one of tetrafluoroethylene and flourinated ethylene propylene extending between first and second circumferentially extending glass-filled seal members.

7. The apparatus of claim 1 or 2 wherein said seal means further comprises a gapped secondary metal seal member, the gap on said seal member radially increasing as said member is urged to sealing position.

8. The apparatus of claim 7; and said second of seamless, knitted elements extrude into said extended gap upon urging of said seal means into sealed relation with said casing.

9. An apparatus adaptable for insertion on a first conduit within a subterranean well having a second conduit extending therein, said apparatus comprising: a cylindrical mandrel communicable to said first conduit; slip means carried exteriorly around said mandrel and movable into expanded position for anchoring said apparatus to said second conduit whereby subsequent longitudinal movement of said apparatus in at least one direction is prevented; and seal means circumferentially extending exteriorly of said mandrel and urgeable into sealing relation with said second conduit to prevent fluid transmission thereacross, said seal means comprising at least one section of transversely compressible seamless, knitted elements generally defined by a continuous series of interlocking ductile, metal-containing loop members, and further comprising [an elastomeric] *a sealing* material introduced among said loop members.

10. The apparatus of claim 9 wherein said seal means further comprises an asbestos-laden material interwoven among said loop members.

11. The apparatus of claim 9 or 10 wherein said seal means further comprises a gapped secondary metal seal member, the gap on said seal member radially increasing as said member is urged to sealing position.

12. The apparatus of claim 11; and said section of seamless, knitted elements extrude into said extended gap upon urging of said seal means into sealed relation with said casing.

13. The apparatus of claim 9 wherein said seal means further comprises a bridging material introduced among said loop members.

14. The apparatus of claim 9, 10 or 13 wherein said seal means further comprises upper and lower sections of said seamless elements, and a first seal member comprising one of tetrafluoroethylene and flourinated ethylene propylene spaced therebetween.

15. The apparatus of claim 14 further comprising at least one circumferentially extending interiorly facing groove on said first seal member to permit flexing of said first seal member during setting of said apparatus.

16. The apparatus of claim 9, 10 or 13 wherein said seal means further comprises upper and lower sections of said seamless elements, and a first seal member comprising one of tetrafluoroethylene and flourinated ethylene propylene extending between first and second circumferentially extending glass-filled seal members.

17. A packer apparatus adaptable for insertion on a conduit within a subterranean well having casing therein, said apparatus comprising: a cylindrical mandrel communicable to said conduit; slip means carried exteriorly around said mandrel and movable into expanded position for anchoring said apparatus to said casing whereby subsequent longitudinal movement of said apparatus in at least one direction is prevented; seal means circumferentially extending exteriorly of said mandrel and urgeable into sealing relation with said casing to prevent fluid transmission thereacross, said seal means comprising at least one section of transversely compressible, seamless, knitted elements generally defined by a continuous series of interlocking ductile, metal-containing loop members, and further comprising fibrous means introduced among said metal-containing loop members for preventing fluid transmission through said loop members.

18. The apparatus of claim 17 wherein said fibrous means comprises an asbestos-laden material interwoven among said loop members.

19. The apparatus of claim 17 wherein said fibrous means comprises [an elastomeric] *a sealing* material introduced among said loop members.

20. The apparatus of claim 17, 18 or 19 wherein said seal means further comprises upper and lower sections of said seamless elements, and a seal member comprising one of tetrafluoroethylene and flourinated ethylene propylene extending between first and second propylene spaced therebetween.

21. The apparatus of claim 17, 18 or 19 wherein said seal means further comprises upper and lower sections of said seamless elements, and a seal member comprising one of tetrafluoroethylene and flourinated ethylene circumferentially extending glass-filled seal members.

22. An apparatus adaptable for insertion on a first conduit within a subterranean well having a second conduit extending therein, and responsive to means for anchoring said apparatus at a predetermined location in a subterranean well, said apparatus comprising seal means for preventing fluid transmission thereacross, said seal means comprising at least one section of transversely compressible, seamless, knitted elements generally defined by a continuous series of interlocking ductile metal-containing loop members and further comprising fibrous means, introduced among said loop members, for preventing fluid transmission through said knitted elements.

23. The apparatus of claim 22 wherein said interspersed fibrous means further comprises [an elastomeric] *a sealing* material introduced among said loop members.

24. The apparatus of claim 22 wherein said interspersed fibrous means comprises an asbestos-laden material interwoven among said loop members.

25. An apparatus for insertion on a first conduit within a subterranean well having a second conduit extending therein, said apparatus comprising: a mandrel communicable to said first conduit; slip means for anchoring said apparatus to said second conduit to prevent longitudinal movement of said apparatus in at least one direction; and seal means extending between said mandrel and said second conduit to prevent fluid transmission thereacross, said seal means comprising a first *primary flexible* sealing element and a second seal means adjacent thereto for preventing extrusion of said primary flexible sealing element after initial sealing relation is established, said second seal means comprising a continuous series of interlocking ductile, metal-containing loop members.

26. The apparatus of claim 25 wherein said second seal means comprises transversely compressible, seamless, knitted elements generally defined by a continuous series of interlocking ductile, metal-containing loop members.

27. The apparatus of claim 25 or 26 wherein similar second seal means are positioned on opposite sides of said first sealing element and said [second] *first* sealing element comprises one of tetrafluoroethylene and flourinated ethylene propylene.

28. An apparatus adaptable for insertion on a first conduit within a subterranean well and responsive to means for positioning said apparatus at a predetermined location in said subterranean well against movement in at least one direction said apparatus comprising seal means for preventing fluid transmission thereacross, said seal means comprising a first sealing element and a second sealing element adjacent thereto for preventing extrusion of said first sealing element after initial sealing relation is established, said second sealing element comprising a continuous series of interlocking ductile, metal-containing loop members.

29. A method of establishing a seal in a subterranean well between a first conduit and an inner wall of a second conduit in said well to prevent fluid communication thereacross; comprising the steps of positioning said second conduit with respect to said first conduit; compressing a knitted wire mesh comprising seamless, knitted elements generally defined by a continuous series of interlocking ductile, metal-containing loop members with a fibrous material introduced among said metal-containing loop members to urge said knitted wire mesh into contact with both said first and second conduits to form a seal therebetween.

30. A method of establishing a seal in a subterranean well between a first conduit and an inner wall of a second conduit in said well to prevent fluid communication thereacross; comprising the steps of positioning and anchoring said second conduit with respect to said first conduit: activating a main sealing component to urge said main sealing component radially outward into sealing relationship between said first and said second conduits; and comprising a knitted wire mesh comprising seamless, knitted elements generally defined by a continuous series of interlocking ductile, metal-containing loop members to urge said knitted wire mesh radially outward into contact with said first and second conduits, urging said knitted wire mesh into contact with said main sealing component immediately adjacent to said knitted wire mesh to fill gaps through which said main sealing component would otherwise extrude.

*31. An apparatus adaptable for insertion on a first conduit within a subterranean well having a second conduit extending therein, and responsive to means for anchoring said apparatus at a predetermined location in a subterranean well, said apparatus comprising seal means for preventing fluid transmission thereacross, said seal means comprising a first sealing element; extrusion preventing back up means preventing extrusion of the first sealing element therepast; and a resilient metallic element, transversely compressible and conformable to the contour of the extrusion preventing means, positioned between the extrusion preventing means and the first sealing element.*

*32. An apparatus adaptable for insertion on a first conduit within a subterranean well having a second conduit extending therein, and responsive to means for anchoring said apparatus at a predetermined location in a subterranean well, said apparatus comprising seal means for preventing fluid transmission thereacross, said seal means comprising a first sealing element; extrusion preventing means radially expandable into engagement with the second conduit for preventing extrusion of the first sealing element therepast; and a resilient metallic element, transversely compressible and conformable to the contour of the extrusion preventing means, positioned between the extrusion preventing means and the first sealing element.*

*33. The apparatus of claim 32 wherein said resilient metallic element comprises a continuous series of interlocking metal-containing loop members.*

*34. The apparatus of claim 33 wherein the extrusion preventing means comprises a gapped secondary metal member, the gap thereon radially increasing as said member is urged into engagement with the second conduit.*

* * * * *